Patented Sept. 21, 1937

2,093,749

UNITED STATES PATENT OFFICE 2,093,749

HYDROCARBON RESINS

Wallene R. Derby, Dayton, Ohio, assignor to Monsanto Chemical Company, St. Louis, Mo., a corporation of Delaware No Drawing. Application January 2, 1937,
Serial No. 118,923

3 Claims. (Cl. 260—2)

The present invention relates to synthetic resins produced from unsaturated hydrocarbons and to methods of producing such resins, and has as its object the provision of an improved resin of this class and a process of producing such an improved resin.

The method of producing hydrocarbon resins by treatment of cracked petroleum distillates with anhydrous aluminum chloride and similar Friedel-Crafts catalysts is disclosed in numerous patents, for example, that granted to Charles A. Thomas and Carroll A. Hochwalt, No. 1,836,629, dated December 15, 1931. Briefly, such a process consists in agitating a suitable cracked petroleum distillate with a small proportion of anhydrous aluminum chloride for a short period of time, whereby resin is formed by polymerization. The aluminum chloride is subsequently removed and the soluble resin is recovered from the solution by distillation or evaporation.

It has now been discovered that when dry acetylene gas is passed through the mixture of cracked petroleum distillate during the treatment with aluminum chloride the resin obtained, after recovery in the usual manner, has a lower iodine value and a higher melting point than the resin made from the same distillate without the addition of acetylene and is improved in several characteristics determining its use in protective coating compositions. The acetylene added during the treatment with aluminum chloride appears to add on to the resin quantitatively, at least within certain limits.

By means of my invention one is enabled to lower the iodine number and to raise the melting point. The addition of acetylene, as described more completely hereinafter, is also beneficial to certain varnish characteristics of the resin, since it yields hydrocarbon resins improved in this respect.

In the practice of the invention the acetylene is added to the cracked petroleum distillate during the treatment with the metallic halide catalyst or directly after this treatment, that is, prior to decomposition of the catalyst. The acetylene is added slowly to the mixture so that it is completely absorbed and enters into reaction. However, if the addition is made rapidly and acetylene escapes from the mixture it can be collected and used in subsequent treatments. The quantity of acetylene which can be added varies widely; as much as 10% of acetylene by weight of the cracked petroleum distillate combines easily during the treatment with the metallic halide. Acetylene can be absorbed in the cracked petroleum distillate prior to the treatment with the catalyst. However, under such conditions, the product is different from that obtained by adding the same proportion of acetylene during the treatment of the cracked petroleum distillate, and, of course, the proportion of acetylene which can be dissolved or absorbed in the cracked distillate is rather small. Also a finished resin can be treated with acetylene according to the method of this invention. For example, the resin is dissolved in petroleum naphtha, aluminum chloride is added, and acetylene is introduced into the reaction mixture. After reaction, the catalyst is decomposed and removed and the resin is recovered and hardened in the usual manner.

When commercial acetylene is used care must be taken to remove all acetone which might be present in the gas, inasmuch as acetone present during the treatment decreases the activity of the catalyst and the resulting products are dark in color and soft.

The method of decomposing the catalyst after the polymerization treatment is the same as heretofore used, the decomposition being effected with, for example, an alcoholic solution of sodium hydroxide and the precipitated insoluble decomposition products being removed by filtration. From the filtrate the resin is recovered by evaporation or distillation.

Instead of using acetylene, higher hydrocarbons of the alkyne or aralkyne series, for example, methylacetylene (propyne or allylene), ethylacetylene (butyne), phenlyacetylene and similar compounds containing a triple bond, produce similar results. However, because of its availability and the lack of sources of supply of its homologues, acetylene is the only member of the series which is now adapted for extensive plant operations.

For the preparation of varnishes from hydrocarbon resins, the reactivity of the resin with drying oils and non-drying oils, as described in the patents granted to Charles A. Thomas, et al., Nos. 2,039,364; 2,039,365; 2,039,366; and 2,039,367, is an important characteristic. The resins made according to the present invention show uniformly improved reactivity in this regard.

Examples of the improvements realized by the practice of the present invention follow:

*Example I.*—A cracked petroleum distillate having a boiling range of 30° to 220° C., resulting from the cracking of gas oil or kerosene at a temperature of 1400° F. at a time of contact of 0.8 second, was used.

To a suspension of 15 grams of anhydrous aluminum chloride in 150 cc. of petroleum naphtha, contained in a vessel provided with a rapid stirrer and an outer jacket through which circulates cooled water, were added slowly 1000 cc. of the cracked petroleum distillate. The additions were made at such a rate that the temperature did not exceed 20° C. After the addition of the distillate the stirring was continued for about 30 minutes and thereafter was added a stoichiometrical proportion of an alcoholic solution of sodium hydroxide sufficient to decompose the catalyst into aluminum hydroxide and sodium chloride. The stirring was continued for 15 minutes and the precipitated solids were then removed by filtration. The clear filtrate was distilled to remove volatile components. The distillation residue, consisting of resin and oily polymers, was then subjected to hardening, during which operation a stream of superheated steam was passed through the residue in the manner of a steam distillation. The resin obtained is characterized below.

A comparable run was made but in this case acetylene was added to the distillate after 750 cc. of distillate had been added to the suspension of aluminum chloride. For this purpose a slow stream of acetone-free dry acetylene was passed into the reaction mixture consisting of the aluminum chloride and 750 cc. of distillate during the course of about one hour. Thereupon, the remaining 250 cc. of the distillate were added and acetylene conducted into the stirred reaction mixture until 92 grams of acetylene had been combined. The period required was approximately 24 hours. The reaction mixture was neutralized and the resin recovered as before. Exactly 92 grams more resin were obtained than when acetylene was not added.

The two resins obtained compared in properties as follows:

|  | Original | With acetylene |
| --- | --- | --- |
| Iodine number | 162.0 | 123.5 |
| Melting point | 110° C. | 133° C. |
| Reactivity with drying oils | Fair | Excellent |

*Example II.*—The cracked petroleum distillate used in Example I was treated with the same proportion of aluminum chloride catalyst as in Example I, but the temperature of the reaction mixture was maintained at 65° C. by warming instead of at 20° C. during the addition of the distillate and prior to the decomposition of the catalyst. Resin was recovered as before.

The run was repeated, using one liter of cracked distillate and maintaining the reaction at 65° C. as before, but after the addition of all the distillate a slow stream of acetylene was passed into the reaction mixture during the course of 9 hours until 40 grams of acetylene had been combined. The catalyst in the mixture was then decomposed as before and resin recovered in the usual manner.

The differences in the resins obtained were found to be as indicated in the following table:

|  | Original | With acetylene |
| --- | --- | --- |
| Iodine number | 160.0 | 117.5 |
| Melting point | 110° C. | 128° C. |
| Reactivity with drying oils | Fair | Excellent |

*Example III.*—A gaseous compressed distillate, called "pressure distillate" was obtained by passing the gaseous products resulting from the pyrolysis of kerosene or gas oil at 1400° F. through a series of compressing operations, in the first of which the gas is compressed under a pressure of 45 pounds per square inch and cooled to 75° F. and in the second it is compressed under a pressure of 300 pounds per square inch and cooled to 75° F. The distillate consisted of the portion which was liquid after the second compression and cooling. It consisted principally of hydrocarbons of 4 carbon atoms, approximately 80% unsaturates of which 40% consists of diolefins.

This pressure distillate was treated with aluminum chloride in much the same manner as in Example I, by passing 12.5 cubic feet thereof into a suspension of 15 grams of anhydrous aluminum chloride in 1000 cc. of petroleum naphtha. The addition was made during the course of 19 hours, after which period the catalyst was destroyed and removed and the resin recovered and hardened in the usual manner.

In another run, carried out in a similar manner, the pressure distillate and a stream of acetylene were passed into the suspension of aluminum chloride concurrently, during the course of 9 hours until 12.5 cubic feet of light pressure distillate and 1.5 cubic feet of acetylene had been added. The catalyst was decomposed and resin was recovered and hardened in the usual manner.

The resins obtained with and without the addition of acetylene compared as follows:

|  | Original | With acetylene |
| --- | --- | --- |
| Iodine number | 126.9 | 125.0 |
| Melting point | 60° C. | 60° C. |
| Reactivity with drying oils | Poor | Fair |

The resin made with acetylene hereinabove is still further improved when additional proportions of acetylene are used.

Friedel-Crafts catalysts other than aluminum chloride can be used to promote the polymerization and condensation reactions described in the above specification. Such catalysts include boron trifluoride, ferric iodide, etc.

The resins obtained in the present invention are similar in solubility and other properties to those described in the patents referred to hereinbefore.

The source of the hydrocarbon mixture to be treated and the conditions of cracking form no part of the present invention. In general, the preferred hydrocarbon fraction to be polymerized contains, in substantial quantities, olefins, diolefins and aromatics and has a boiling point up to approximately 180°–220° C. Such material is most readily obtained by pyrolysis of petroleum or fractions thereof or gases such as refining gases or natural gases under conditions which form the liquid products rich in olefins, diolefins and aromatics.

Inasmuch as the specification contains preferred embodiments of the invention, it is to be understood that these are illustrative rather than limiting and that modifications and variations can be made therein without departing substantially from the spirit of the invention, which is defined in the appended claims.

What I claim is:

1. In the method of producing a hydrocarbon resin by polymerization of a liquid hydrocarbon mixture having an end-point not substantially in excess of 220° C. and being rich in olefines, diolefines and aromatics, said polymerization being effected by means of a Friedel-Crafts catalyst, the improvement characterized in that acetylene is caused to react with the hydrocarbon mixture in the presence of said catalyst.

2. The improvement as defined in claim 1 and further characterized in that the acetylene is added to the hydrocarbon mixture after the said hydrocarbon mixture has undergone polymerization in the presence of the aluminum chloride.

3. In the method of producing a hydrocarbon resin by polymerization of a liquid hydrocarbon mixture having an end-point not substantially in excess of 220° C. and being rich in olefines, diolefines and aromatics, said polymerization being effected by means of a Friedel-Crafts catalyst, the step whereby the melting point of the resin product is increased characterized in that acetylene is caused to react with the hydrocarbon mixture in the presence of said catalyst.

WALLENE R. DERBY.